United States Patent
Barsky

(10) Patent No.: US 11,935,209 B1
(45) Date of Patent: Mar. 19, 2024

(54) SYSTEMS AND METHODS FOR DYNAMIC BACKFILLING OF A THREE-DIMENSIONAL OBJECT

(71) Applicant: Illuscio, Inc., Culver City, CA (US)

(72) Inventor: Kevan Spencer Barsky, Los Angeles, CA (US)

(73) Assignee: Illuscio, Inc., Culver City, CA (US)

( * ) Notice: Subject to any disclaimer, the term of this patent is extended or adjusted under 35 U.S.C. 154(b) by 0 days.

(21) Appl. No.: 18/357,515

(22) Filed: Jul. 24, 2023

(51) Int. Cl.
*G06T 19/20* (2011.01)
*G06T 15/20* (2011.01)
*G06T 17/00* (2006.01)

(52) U.S. Cl.
CPC .............. *G06T 19/20* (2013.01); *G06T 15/20* (2013.01); *G06T 17/00* (2013.01); *G06T 2210/56* (2013.01); *G06T 2219/2004* (2013.01); *G06T 2219/2012* (2013.01)

(58) Field of Classification Search
CPC ......... G06T 19/20; G06T 15/20; G06T 17/00; G06T 2210/56; G06T 2219/2004; G06T 2219/2012
See application file for complete search history.

(56) References Cited

U.S. PATENT DOCUMENTS

| | | | |
|---|---|---|---|
| 9,772,405 B2 | 9/2017 | Mundhenk et al. | |
| 2020/0258247 A1 | 8/2020 | Lasserre et al. | |
| 2021/0225020 A1* | 7/2021 | Nonn .................. | H04N 13/117 |
| 2022/0358023 A1 | 11/2022 | Moser et al. | |

OTHER PUBLICATIONS

Virtanen, Juho-Pekka, et al. "Interactive dense point clouds in a game engine." ISPRS Journal of Photogrammetry and Remote Sensing 163 (2020): 375-389. (Year: 2020).*

Qian, Yue, et al. "Deep magnification-flexible upsampling over 3d point clouds." IEEE Transactions on Image Processing 30 (2021): 8354-8367. (Year: 2021).*

Schütz, Markus, and Michael Wimmer. "Rendering large point clouds in web browsers." Proceedings of CESCG (2015): 83-90. (Year: 2015).*

(Continued)

*Primary Examiner* — Daniel F Hajnik
(74) *Attorney, Agent, or Firm* — Ansari Katiraei LLP; Armani Katiraei; Sadiq Ansari

(57) ABSTRACT

Disclosed is a graphics system and associated methods for dynamic backfilling a point cloud to conceal gaps that appear when zooming into the point cloud. The dynamically backfilling fills a gap with dynamically generated points that continue a texture, contour, pattern, shape, coloring, and/or other commonality of an original set of points from the point cloud that form a single continuous surface with that gap. The system defines a model based on images of an object or scene. The model represents the object or scene at different zoom depths with different dynamically generated points. The system determines that a requested render position exposes a gap in the original set of points. The system fills the gap by using the model to generate points at positions over the gap that continue a shape, form, or structure of a single continuous surface formed by the original set of points.

20 Claims, 9 Drawing Sheets

(56) References Cited

OTHER PUBLICATIONS

Ben Mildenhall et al., "NeRF: Representing Scenes as Neural Radiance Fields for View Synthesis", Aug. 3, 2020, 25 pages, arXiv:2003.08934v2.
Alex Yu et al., "pixelNeRF: Neural Radiance Fields from One or Few Images", May 30, 2021, 20 pages, arXiv:2012.02190v3.
Michael Niemeyer et al., "RegNeRF: Regularizing Neural Radiance Fields for View Synthesis from Sparse Inputs", Dec. 1, 2021, 11 pages, arXiv:2112.00724v1.
Haithem Turki et al., "Mega-NeRF: Scalable Construction of Large-Scale NeRFs for Virtual Fly-Throughs", Dec. 20, 2021, 14 pages.
Daniel Rebain el al., "LOLNeRF: Learn from One Look", Apr. 26, 2022, 12 pages, arXiv:2111.09996v2.

\* cited by examiner

SYSTEMS AND METHODS FOR DYNAMIC BACKFILLING OF A THREE-DIMENSIONAL OBJECT

BACKGROUND

A point cloud may produce a three-dimensional ("3D") representation of an object or scene with a multitude of points that are distributed across a 3D space. The points may exist independent and disconnected from one another, and may be non-uniformly distributed in the 3D space to create regions with a higher density or concentration of points than other regions.

From a distance, the points blend together to create seemingly connected and continuous surfaces of the object or scene. The spaces in between points may become more and more visible upon zooming in or rendering the points from closer and closer render positions. The spaces may create noticeable gaps or discontinuity in the rendered object or scene.

Solutions for resolving the gaps or visual discontinuities may include increasing the size of the points to reduce the spacing between the points when zooming in, or creating new points in the space between two or more directly neighboring points by taking the average positions and color values of the two or more directly neighboring points. These solutions may plug the gaps and restore the visual continuity at the expense of image quality. For instance, increasing the point size may result in a pixelated or blocky image and a low resolution or inaccurate rendering of the object or scene as a result of the enlarged points extending into spaces they did not originally span. In other words, increasing the point size may change the overall shape and form of the surfaces represented by those points. Similarly, adding points based on an averaging of values from directly neighboring points may distort or change the texture, shape, and/or form of the surfaces represented by a set of original points and added points. In other words, adding the points based on average positions and/or color values may result in the points having positions or colors that deviate from an overall positioning or color pattern.

DETAILED DESCRIPTION OF PREFERRED EMBODIMENTS

The following detailed description refers to the accompanying drawings. The same reference numbers in different drawings may identify the same or similar elements.

Provided are systems and associated methods for dynamically backfilling a three-dimensional ("3D") object. The dynamic backfilling is performed according to a modeling of the textures, contours, patterns, shapes, and/or commonality of the surfaces forming the 3D object.

The dynamic backfilling creates new points in a point cloud as the render position moves closer and closer onto a set of points and the gaps between the set of points become visible. The dynamic backfilling creates the new points to remove or conceal the gaps before the gaps introduce discontinuity in the represented or rendered surfaces.

The dynamically backfilling creates the new points by modeling one or more of the texture, contour, pattern, shape, and/or other commonality from a set of points in a varying sized region that form a single continuous surface and that include or surround a gap. The size of the region and/or the set of points varies according to the number of points required to establish and/or accurately represent the surface texture, contour, pattern, shape, and/or commonality. In other words, the set of points used in modeling the commonality includes a greater number of points and points that are further away from the gap than the points that directly neighbor or border the gap. The dynamic backfilling creates the new points with positions and colors that match the modeled texture, contour, pattern, shape, and/or commonality of the set of points or the surface represented by the set of points.

In some embodiments, the dynamic backfilling is performed by a graphics system. The graphics system uses one or more neural networks to detect and model the texture, contour, pattern, shape, and/or commonality amongst a set of points that form a continuous surface with a gap that is exposed as the render position moves closer to and/or zooms in on the set of points. The graphics system plugs or removes the exposed gap by dynamically defining new points according to the modeling of the surface.

The dynamic backfilling produces zoomed in visualizations of the point cloud with greater accuracy and realism than backfilling techniques that simply increase the size of the existing points or that add points in gaps based on the average positional and/or non-positional values of the points that immediately surround or border the gaps. Specifically, the dynamic backfilling retains or even increases image quality when zooming into a point cloud since the dynamically backfilled points are positioned and/or colored to match the modeled texture, contour, pattern, shape, and/or other commonality of the surfaces that receive the dynamically backfilled points.

Figure 1:
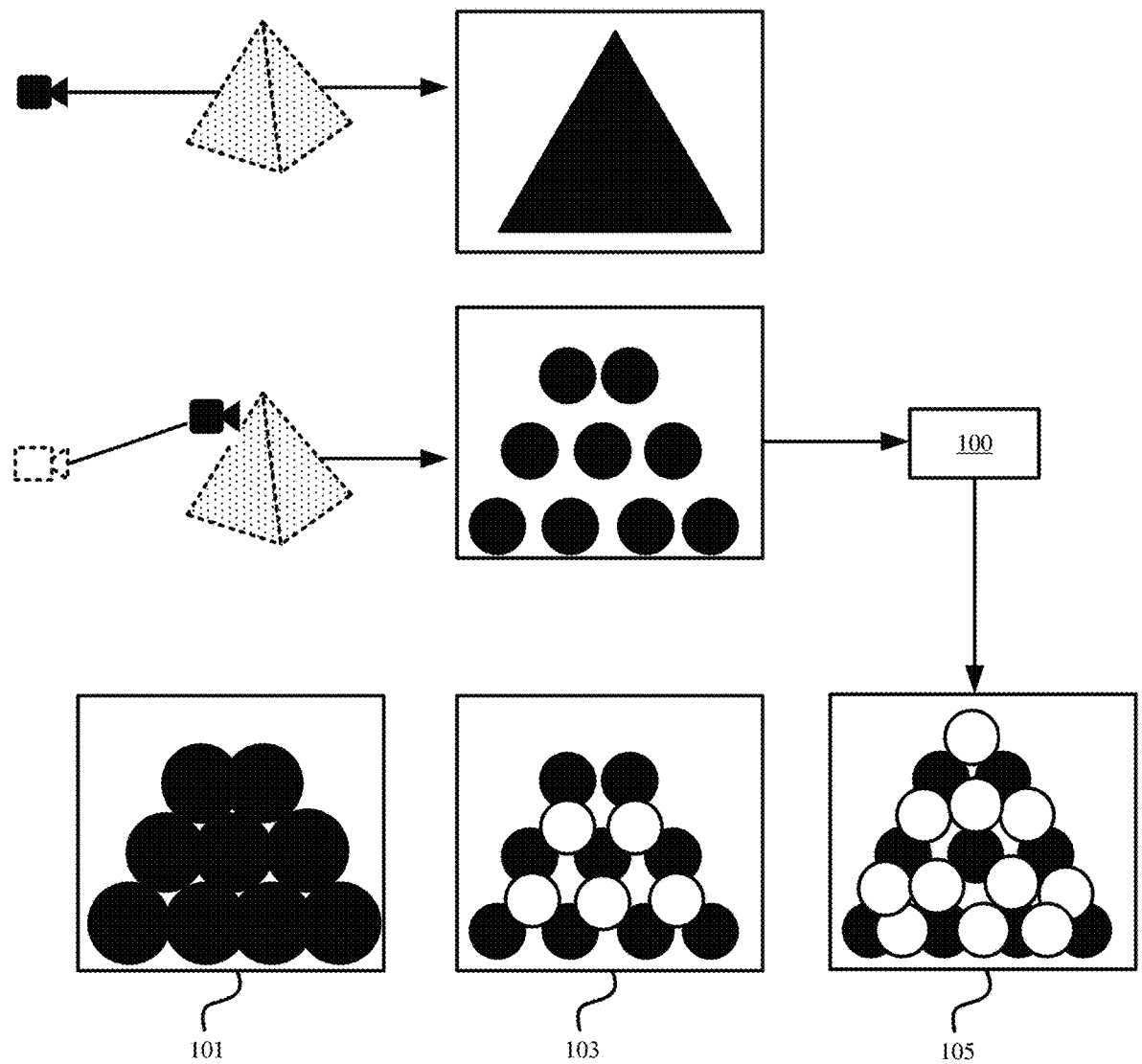
FIG. 1 illustrates an example of the difference in image quality resulting from backfilling a point cloud by increasing point size, adding points based on averaged values of directly neighboring points, and adding points via the dynamic backfilling performed in accordance with some embodiments presented herein.

FIG. 1 illustrates an example of the difference in image quality resulting from backfilling a point cloud by increasing point size, adding points based on averaged values of directly neighboring points, and adding points via the dynamic backfilling performed in accordance with some embodiments presented herein. As shown in FIG. 1, zooming into a region of a point cloud may expose one or more gaps between points in the zoomed in region of the point cloud.

As shown in first visualization 101, increasing the size of the points to conceal the gap causes the points to also span outwards into other regions that the points did not originally span. Consequently, the shape of the surface represented by the expanded points deviates from the original shape of the 3D object represented by the originally sized points. In this example, the enlarged points have made the shape wider than its original size and lessened the slope of the shape. The deviating shape lessens the accuracy of the rendered visualization, and reduces the quality of the visualization as a user zooms closer and closer into the represented surface.

As shown in second visualization 103, concealing the gap by adding points based on the average positional and non-positional values of two or more points that directly border or surround the gap may also reduce the image quality. For instance, the added points may be positioned or colored in a manner that deviates from the overall texture, contour, pattern, shape, and/or other commonality of other points that represent the same surface in the visualization as the two or more points that directly border or surround the gap. The original set of points are represented with shaded or black circles and the added points are represented with unshaded or white circles in second visualization 103.

Also, adding points based on the average positional and non-positional values of points directly neighboring a gap may cause intentional gaps in the 3D representation between discrete surfaces to be removed and the discrete surfaces to become connected. For instance, the added points reduce the overall sharpness of the discrete surfaces by blending the discrete surfaces into a single continuous or connected surface.

The dynamic backfilling performed by graphics system 100 overcomes the quality degradation, introduced deviations in the represented surface, and/or removal of intentional gaps that result from backfilling by enlarging points or adding points based on averages of existing points. The dynamic backfilling involves analyzing the point cloud to determine the set of points that form the same surface, determining the texture, contour, pattern, shape, and/or other commonality of the surface, and adding points to conceal the gaps at positions and with coloring that adheres to and matches the determined texture, contour, pattern, shape, and/or other commonality of the surface.

Third visualization 105 illustrates the result of dynamically backfilling the set of points based on the modeled commonality of the represented surface. The original set of points are represented with shaded or black circles and the added points are represented with unshaded or white circles in third visualization 105. As shown in third visualization 105, the dynamic backfilling therefore conceals the gaps without changing or deviating from the texture, contour, pattern, shape, and/or other commonality of the surface, thereby preserving or enhancing the quality of the rendered surface at any of several zoom depths that further increase the spacing between the original set of points that form that surface.

Graphics system 100 uses a Neural Radiance Field ("NeRF"), NeRF variations (e.g., Regularized NeRF ("Reg-NeRF"), pixelNeRF, Mega-NeRF, Learn From One Look NeRF ("LOLNeRF"), Mipmap NeRF ("Mip-NeRF"), point-NeRF, etc.), and/or other neural networks to perform the dynamic backfilling. Specifically, graphics system 100 may use the NeRF, NeRF variations, and/or other neural networks to determine the set of points within a point cloud that form a continuous surface with one or more gaps subject to the dynamic backfilling, model the texture, contour, pattern, shape, and/or other commonality of the surface, and perform the dynamic backfilling of the gaps from that continuous surface based on the modeling.

NeRFs and/or other neural networks may be used to generate entire point clouds or 3D mesh models from multiple images that capture the same object or scene from different positions, angles, or viewpoints. Specifically, the NeRF may be a fully-connected neural network that generates novel views of a 3D object or scene based on a set of 2D images that partially capture that 3D object or scene from different viewpoints.

The point clouds or 3D mesh models generated by a NeRF or neural network are not validated against any reference point cloud or 3D mesh model. Consequently, if the NeRF or neural network incorrectly models any texture, contour, pattern, shape, and/or other commonality from any surface or part of the represented object or scene, the NeRF or neural network will incorrectly generate points and render that surface or part of the represented object or scene at every zoom depth or in every visualization of that surface or part.

Moreover, the point clouds or 3D mesh models generated by the NeRFs and/or neural networks may not have a fixed resolution as each point or mesh is dynamically generated based on the current zoom depth. Accordingly, there may be no fixed data or base data that is editable in the NeRF-generated point cloud or 3D mesh model.

Rather than rely exclusively on NeRFs or neural network to generate and backfill a point cloud, graphics system 100 uses a point cloud that is generated independent of the NeRF and/or neural network model as a basis-of-truth for tuning the NeRF and/or neural network model. The point cloud may be generated via a photogrammetry, 3D scanning, or other technique without the use of NeRFs or neural networks. Graphics system 100 then uses the tuned NeRF and/or neural network model to backfill the independently generated point cloud.

Tuning the NeRF and/or neural network model includes training the NeRF using the same set of 2D images that were used to generated the reference point cloud, and adjusting the synapses, connections, and/or weighting of the NeRF and/or neural network model to arrive at a model that generates the positioning and/or coloring of the points from the reference point cloud with the greatest accuracy or least deviation. Graphics system 100 uses the tuned model to dynamically backfill the reference point cloud as needed. Specifically, the tuned model is trained to accurately recreate the textures, contours, patterns, shapes, and/or other commonality across the reference point cloud so that it may be used to dynamically backfill the reference point cloud with points that match the textures, contours, patterns, shapes, and/or other commonality of the reference point cloud.

Figure 2:
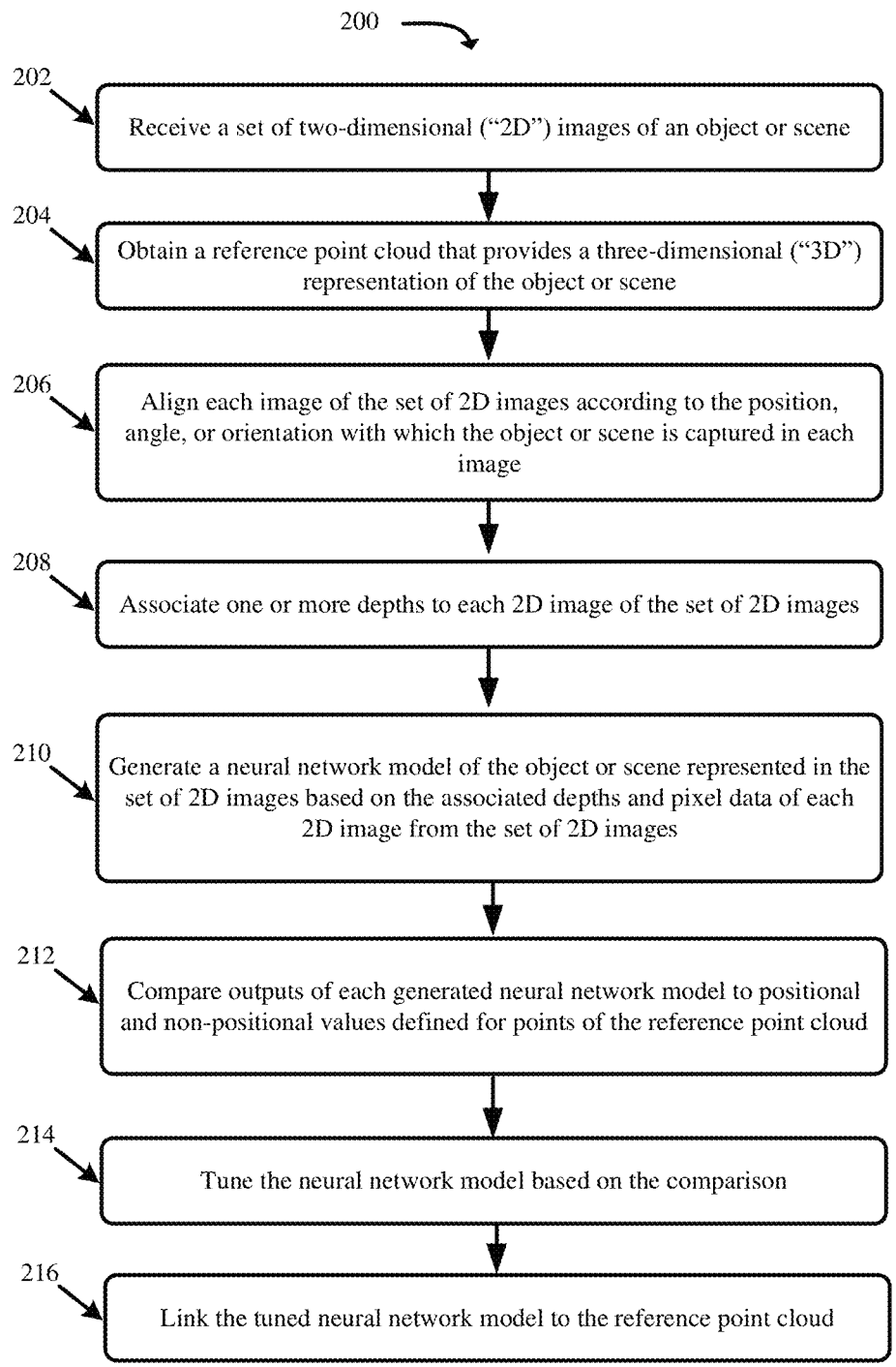
FIG. 2 presents a process for training and tuning a neural network for dynamic backfilling of a point cloud that is generated separate from the neural network in accordance with some embodiments presented herein.

FIG. 2 presents a process 200 for training and tuning a neural network for dynamic backfilling of a point cloud that is generated separate from the neural network in accordance with some embodiments presented herein. Process 200 is implemented by graphics system 100.

Graphics system 100 includes one or more devices or machines with processor, memory, storage, network, and/or other hardware resources that perform the neural network modeling of a 3D object or scene based on a set of 2D images of the object or scene, and that perform the dynamic backfilling of point clouds based on the neural network modeling of the 3D object or scene. Graphics system 100 may perform other operations and/or graphical functionality including editing, rendering, interacting with, and/or processing of the dynamically backfilled point clouds.

Process 200 includes receiving (at 202) a set of 2D images of an object or scene. The set of 2D images includes two or more images that capture the object or scene from different positions, angles, or perspectives.

In some embodiments, the set of 2D images may be used to generate a reference point cloud and to separately train the neural network model for the represented object or scene. For instance, graphics system 100 or another system may generate the reference point cloud via a photogrammetry technique. In some other embodiments, the reference point cloud is generated from scanning the object or scene using a 3D scanner. The 3D scanner is different than the camera or other imaging device used to capture the set of 2D images. In any case, process 200 includes obtaining (at 204) the reference point cloud that is derived separate and independent of the neural network model being trained and tuned. The reference point cloud is a 3D representation of the object or scene within the set of 2D images.

Process 200 includes aligning (at 206) each image of the set of 2D images according to the position, angle, or orientation with which the object or scene is captured in each image. In some embodiments, aligning (at 206) the set of 2D images includes determining the location and/or direction at which each image of the set of 2D images is captured. In some embodiments, aligning (at 206) the set of 2D images includes positioning and/or orienting each 2D image of the set of 2D images in a 3D space according to the size and angle at which the object or scene is captured in that 2D image.

Process 200 includes associating (at 208) one or more depths to each 2D image of the set of 2D images. In some embodiments, a cost volume-based 3D Convolutional Neural Network ("CNN") is used to determine and associate (at 208) the one or more depths to each 2D image.

Process 200 includes generating (at 210) a neural network model of the object or scene represented in the set of 2D images based on the associated (at 208) depths and pixel data of each 2D image from the set of 2D images. Generating (at 210) the neural network model may include defining a radiance field based on the aligned (at 206) set of 2D images, and generating points of a point cloud or a 3D representation of the object or scene via the radiance field.

In some embodiments, the radiance field describes how light transport occurs throughout the 3D volume represented by the set of 2D images. In some embodiments, the radiance field may be represented as function that describes the direction of light rays moving through every x, y, and z coordinate A in space and in every direction d, described either as θ and φ angles or a unit vector. Collectively, they form a five-dimensional ("5D") feature space that describes light transport in the volume represented by the set of 2D images. The function defines a mapping from the 5D feature space to a four-dimensional ("4D") space consisting of color c=(R,G,B) and a density a, which may represent the likelihood that the light ray at the 5D coordinate space is terminated. For instance, for every pixel of every 2D image, rays are projected through the scene to generate samples at (A, d) locations. The sample at (A, d) locations and the viewing direction of the sampled 2D image are used to generate the (c, σ) values. Accordingly, the function for a NeRF model may have the form F: (A,d)→(c,σ).

In some embodiments, process 200 generates (at 210) neural network models according to different NeRF techniques. Each NeRF technique may generate a different function based on differences in the radiance field represented by each function, and the different functions may specify different positioning and/or coloring for the points generated by the corresponding neural network work.

The generated (at 210) neural network model accurately represents and/or recreates the textures, contours, patterns, shapes, and/or other commonality across the different surfaces of the object or scene. Specifically, the radiance field or representative function predicts the light intensity or radiance at any point in the 2D images in order to generate points in a 3D space that reconstruct the textures, contours, patterns, shapes, and/or other commonality for the different surfaces captured in the 2D images.

Figure 3:
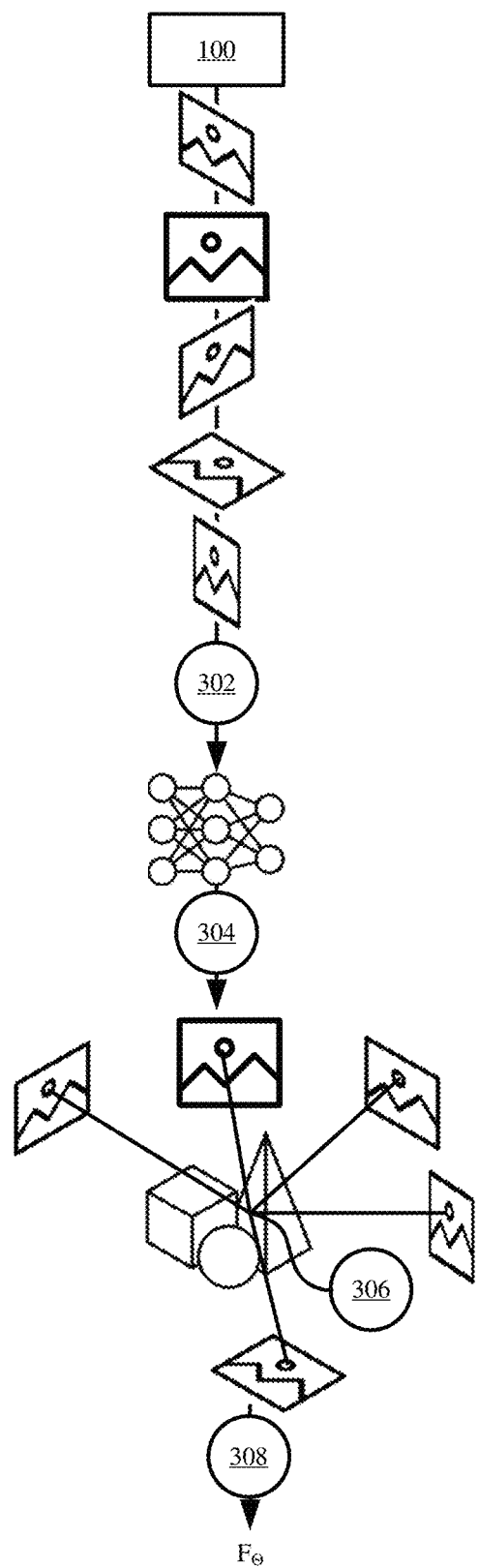
FIG. 3 illustrates an example of generating a radiance field in accordance with some embodiments presented herein.

FIG. 3 illustrates an example of generating a radiance field in accordance with some embodiments presented herein. Graphics system 100 may provide (at 302) a set of 2D images as training data to a neural network. The set of 2D images includes images of the same object or scene taken from different positions, angles, or viewpoints.

The neural network aligns (at 304) the set of 2D images based on the position, angle, or viewpoint with which each 2D image captures the represented object or scene. The neural network generates (at 306) the radiance field by projecting rays from or through the images to converge on the same represented features or surfaces of the object or scene in a 3D space, and by defining (at 308) a function that represents the radiance field and that converts the 5D coordinate space to the 4D color and density space.

With reference back to FIG. 2, process 200 includes comparing (at 212) outputs of each generated (at 210) neural network model to positional and non-positional values defined for points of the reference point cloud. Comparing (at 210) the outputs may include generating points for a point cloud based on the neural network model or the function of the represented radiance field, and determining deviations between the generated points and the defined points of the reference point cloud.

Process 200 includes tuning (at 214) the neural network model based on the comparison (at 212). When process 200 generates (at 210) multiple neural network models, tuning (at 214) the neural network model may include selecting the neural network model from the multiple neural network models that generates points with the fewest deviations from the points of the reference point cloud.

Tuning (at 214) the neural network model includes adjusting one or more parameters of the generated (at 210) or selected neural network model. Adjusting the one or more parameters may also include adjusting one or more of the synapses, connections, and/or weighting of the neural network model, generating new points based on the adjusted parameters, and retaining the adjusted parameters when the new points more closely match the positional and non-positional values of the points from the reference point cloud than the points generated from the preadjusted parameters. For instance, graphics system 100 may adjust one or more of the A, d, c, and/or a parameters of the radiance field, and determine whether the positions and/or colors of the points generated from the adjusted function reduce the deviation that was tracked when comparing (at 212) the outputs generated by the preadjusted function to the positional and non-positional values defined for the points of the reference point cloud.

In some embodiments, tuning (at 214) the neural network model includes performing a regression. For instance, after each adjustment is made to the one or more parameters of the neural network model, the outputs of the adjusted neural network model are compared (at 212) to the reference point cloud, and the process repeats until the comparison (at 212) indicates that the points generated by the adjusted neural network model deviate by less than a threshold amount from the points of the reference point cloud, or the adjustments do not further improve the amount by which the generated points of the adjusted neural network model match or deviate from the points of the reference point cloud.

Process 200 includes linking (at 216) the tuned neural network model to the reference point cloud. Linking (at 216) the tuned neural network model may include defining a pointer, tag, or other identifier that creates an association between the tuned neural network model and the reference point cloud. Graphics system 100 may perform the dynamic backfilling of the reference point cloud based on points that are generated by the tuned neural network model that is linked (at 216) to the reference point cloud.

Figure 4:
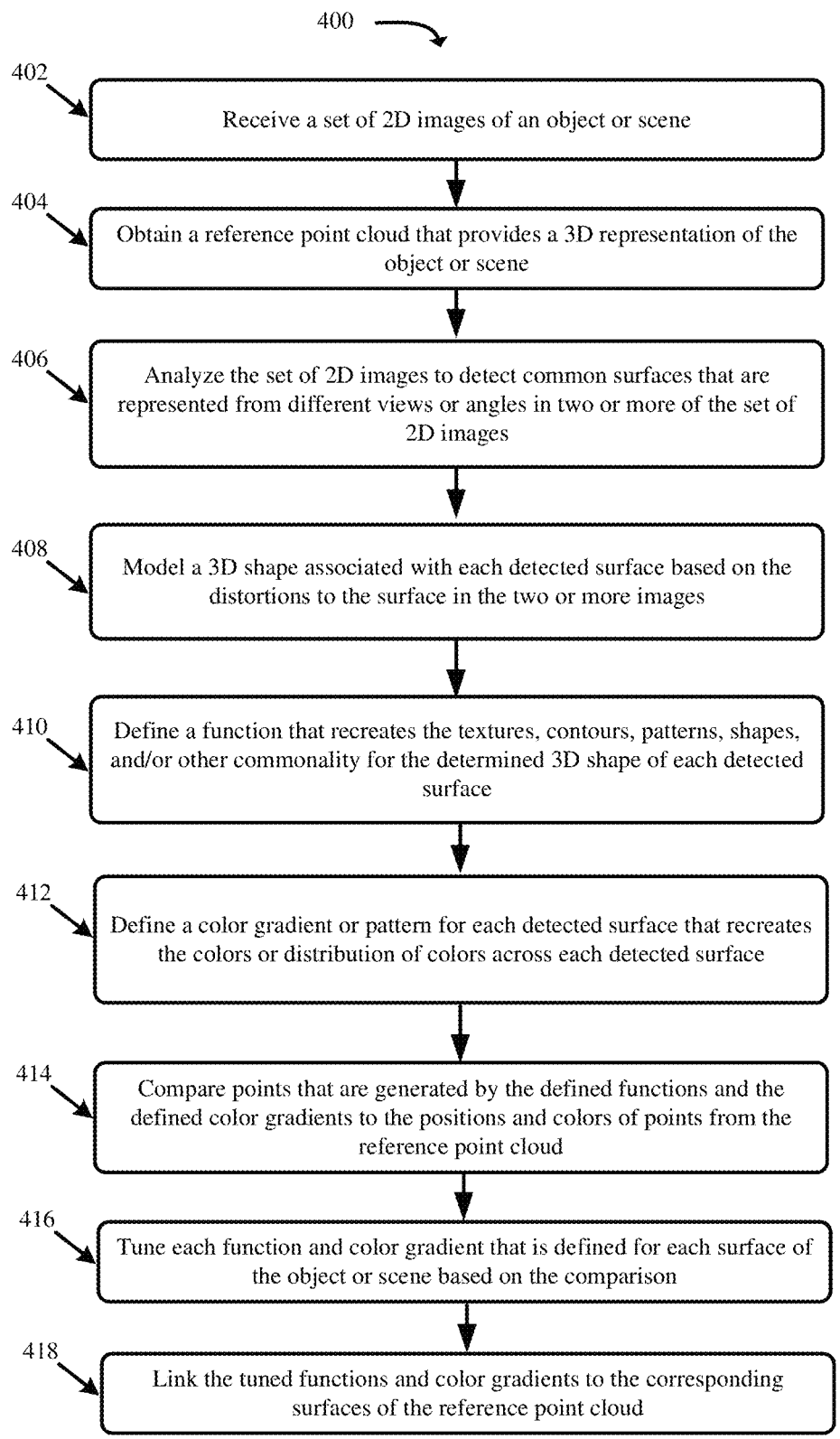
FIG. 4 presents a process for training and tuning a model for the dynamic backfilling of a reference point cloud in accordance with some embodiments presented herein.

Graphics system 100 may use other neural networks or artificial intelligence and/or machine learning ("AI/ML") techniques to model the textures, contours, patterns, shapes, and/or other commonality across different surfaces of an object or scene from multiple 2D images of that object or scene. FIG. 4 presents a process 400 for training and tuning a model for the dynamic backfilling of a reference point cloud in accordance with some embodiments presented herein. Process 400 is implemented by graphics system 100.

Process 400 includes receiving (at 402) a set of 2D images of an object or scene. The set of 2D images includes two or more images that capture the object or scene from different positions, angles, or perspectives.

Process 400 includes obtaining (at 404) the reference point cloud for the object or scene. The reference point cloud is a 3D representation of the object or scene within the set of 2D images.

Process 400 includes analyzing (at 406) the set of 2D images to detect common surfaces that are represented from different views or angles in two or more of the set of 2D images. For instance, graphics system 100 may provide the set of 2D images as inputs to a neural network or an AI/ML technique that performs image or pattern recognition. The neural network or AI/ML technique associates different sets of pixels in the two or more images that have matching or similar color values and common relative positions about the object or scene represented in each of the two or more images as pixels representing the same surface in the different 2D images.

Process 400 includes modeling (at 408) a 3D shape associated with each detected surface based on the distortions to the surface in the two or more images. Modeling (at 408) includes approximating the positions of each surface in a 3D space based on the positioning and/or distortions of the different sets of pixels that represent the same surface in the two or more images of the set of 2D images.

Process 400 includes defining (at 410) a function that recreates the textures, contours, patterns, shapes, and/or other commonality for the modeled (at 408) 3D shape of each detected surface. Moreover, process 400 includes defining (at 412) a color gradient or pattern for each detected surface that recreates the colors or distribution of colors across each detected surface.

Process 400 includes comparing (at 414) points that are generated by the defined (at 410) functions and the defined (at 412) color gradients to the positions and colors of points from the reference point cloud. In some embodiments, process 400 includes comparing (at 414) the points that are generated for a particular surface of the object or scene by the function and color gradient that are defined (at 410 and 412) for that particular surface to the points representing that particular surface in the reference point cloud, and determining any deviations between the positioning and coloring of the generated points and the positioning and colorings of the points from the reference point cloud.

Process 400 includes tuning (at 416) each function and color gradient that is defined for each surface of the object or scene based on the comparison (at 414). The tuning (at 416) may include performing a regression in which graphics system 100 adjusts one or more parameters or weights of the functions and/or color gradients, compares the points that are generated with the adjusted parameters or weights to the points of the corresponding surface from the reference point cloud, and selects or retains the parameters or weights that generate points that have positions and color values closest to points of the corresponding surface from the reference point cloud.

Process 400 includes linking (at 418) the tuned functions and color gradients to the corresponding surfaces of the reference point cloud. For instance, each region of the reference point cloud that corresponds to a different surface of the represented object or scene may be linked (at 418) to a different function and color gradient.

Figure 5:
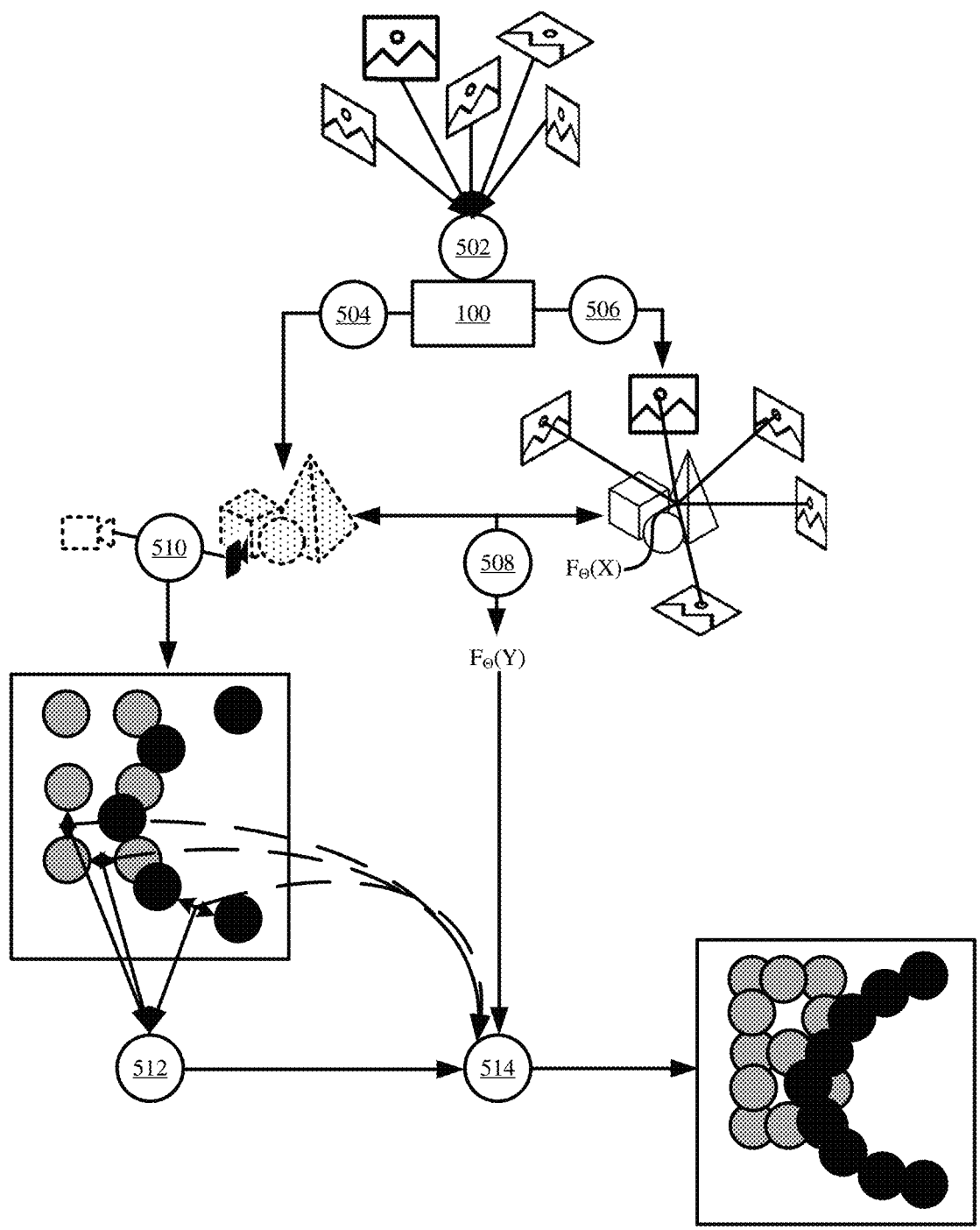
FIG. 5 illustrates an example of performing the dynamic backfilling in accordance with some embodiments presented herein.

FIG. 5 illustrates an example of performing the dynamic backfilling in accordance with some embodiments presented herein. Graphics system 100 receives (at 502) a set of 2D images. The set of 2D images include images of the same object or scene taken from different positions, angles, or viewpoints.

Graphics system 100 generates (at 504) a 3D representation of the object or scene from a photogrammetry processing of the set of 2D images. The photogrammetry processing may include aligning the set of 2D images based on common points-of-reference that are captured from the different positions, angles, or viewpoints. The photogrammetry processing involves determining a depth or 3D position associated with each imaged point of the object or scene based on the deviation of the imaged point in the different 2D images. The photogrammetry processing further includes defining a point cloud point at the determined depth or 3D position with the color values from one or more pixels in the set of 2D images that capture the imaged point. Accordingly, graphics system 100 generates (at 504) a point cloud with points that collectively form the 3D shape and form of the object or scene in the set of 2D images. The resulting 3D representation or point cloud may be defined with a fixed resolution, and/or may be viewed and edited.

Graphics system 100 trains (at 506) a NeRF or other neural network using the set of 2D images. The NeRF arranges the images according to the position and angle from which each 2D image of the set of 2D images captures the object or scene. The NeRF defines a radiance field based on the arranged images and/or the position and angle associated with each 2D image. The radiance field models the textures, contours, patterns, shapes, and/or other commonality across different surfaces of the imaged object or scene, and defines a fully connected model to recreate the modeled textures, contours, patterns, shapes, and/or other commonality. Specifically, the fully connected model receives 5D coordinates derived from the arranged set of 2D images as inputs, and generates outputs for the density and color at any location in the 3D space spanned by the radiance field.

Graphics system 100 tunes (at 508) the NeRF and/or fully connected model by comparing the outputs of the fully connected model to the points of the separately derived point cloud. In some embodiments, graphics system 100 provides 5D coordinates to the fully connected model that correspond to positions of points from the point cloud, and determines the amount by which the color values of the points generated by the fully connected model differ from the color values of the points from the point cloud. In some other embodiments, graphics system 100 generates a point cloud for the 3D space spanned by the radiance field using the fully connected model of the NeRF, and determines variation in the positioning and/or coloring of the generated points to the positioning and/or coloring of the points from the photogrammetry derived point cloud. Tuning (at 508) the NeRF includes performing a regression by adjusting one or more parameters and/or weights of the NeRF, regenerating the points based on the adjusted parameters, and determining the set of parameters for the NeRF that generates points with the least deviation from the points of the reference point cloud.

Graphics system 100 dynamically backfills the point cloud using the tuned NeRF. Graphics system 100 tracks (at 510) user interaction with the point cloud. The user interaction may include inputs for editing the point cloud or for changing the render position or viewpoint within the point cloud.

Graphics system 100 determines (at 512) when the user interaction causes discontinuities to appear in the rendering of the point cloud. For instance, graphics system 100 identifies a zoom depth or render position at which the spacing between the points becomes visible. Graphics system 100 also differentiates discontinuities within a single continuous surface from discontinuities between two or more different surfaces. Specifically, graphics system 100 identifies spacing between points that creates a discontinuity, and determines if the points are part of the same continuous surface based on the points having common coloring or are positioned according to a common pattern or structure. If the points are part of the same continuous surface, then graphics system 100 initiates the dynamic backfilling of the spacing between the points that create the discontinuities in the same continuous surface.

Graphics system 100 initiates the backfilling to resolve or remove the discontinuities occurring amongst points of a common surface. Graphics system 100 dynamically backfills (at 514) the point cloud by using the tuned NeRF to generate points that conceal or fill the discontinuities occurring amongst points of the common surface.

The dynamic backfilling (at 514) increases or enhances the resolution of the common surface from the adjusted render position by populating the common surface with new or added points in positions that continue or follow the modeled shape and/or visual characteristics of the original points that define the common surface. In some embodiments, the dynamic backfilling (at 514) includes using the tuned NeRF to artistically enhance the common surface. For instance, graphics system 100 uses the NeRF to add points that create or enhance finer geometric details of the common surface in a manner that simulates the subdividing of the topology for the one or more polygons representing the common surface.

Figure 6:
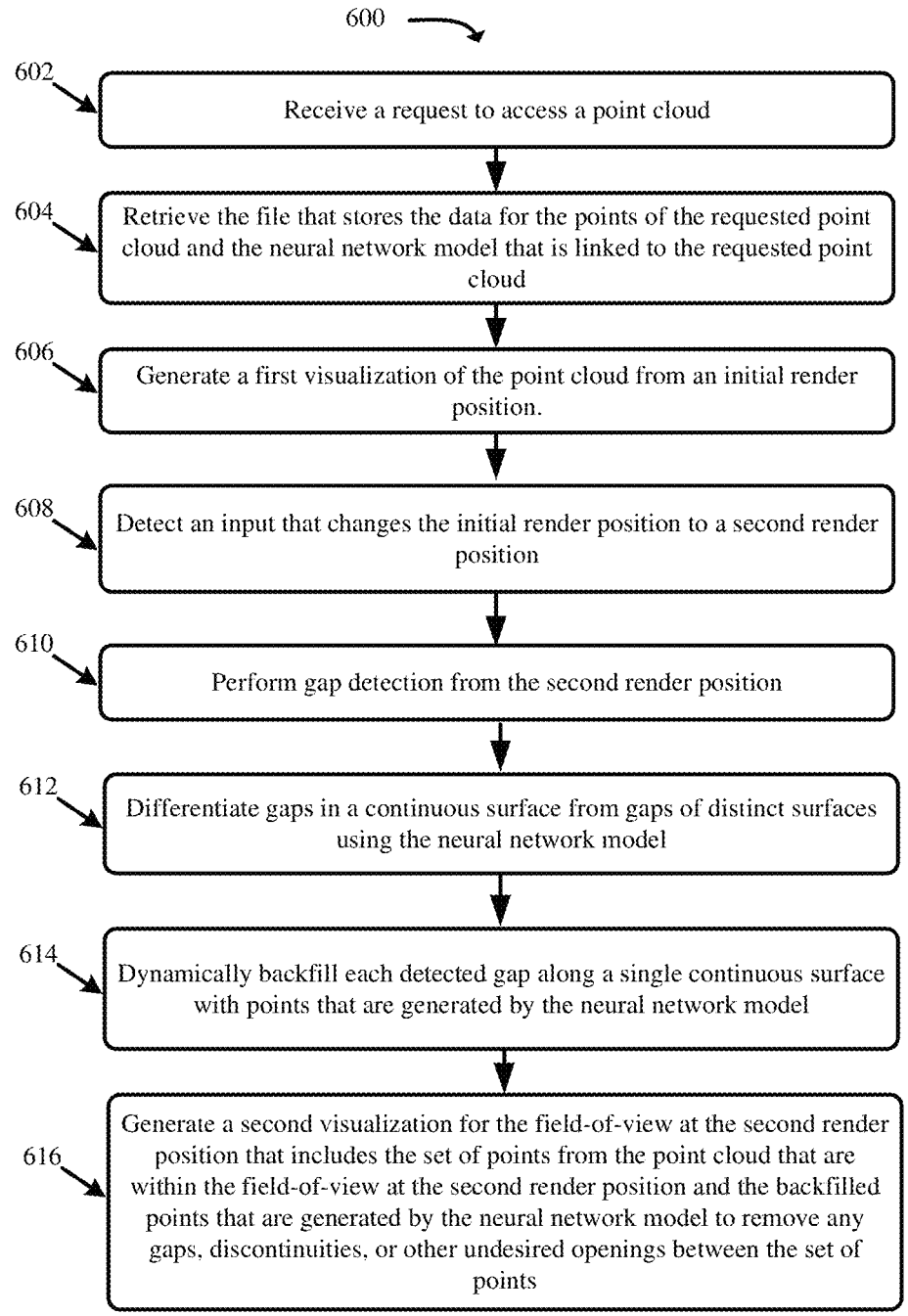
FIG. 6 presents a process for the dynamically backfilling of a point cloud with points that are dynamically generated from a separately trained and tuned neural network in accordance with some embodiments presented herein.

FIG. 6 presents a process 600 for the dynamically backfilling of a point cloud with points that are dynamically generated from a separately trained and tuned neural network in accordance with some embodiments presented herein. Process 600 is implemented by graphics system 100.

Process 600 includes receiving (at 602) a request to access a point cloud. For instance, a user may open a point cloud viewing, editing, or processing application and select the point cloud, or the user may select the point cloud file from a file structure or with a network request (e.g., a HyperText Transfer Protocol GET message).

Process 600 includes retrieving (at 604) the file that stores the data for the points of the requested point cloud and the neural network model that is linked to the requested point cloud. In some embodiments, the point cloud file may be embedded with a link, pointer, or metadata for accessing the neural network model. In some embodiments, the neural network model may be integrated into the point cloud file or may be a data structure or file that exists separate from the data structure or file of the point cloud.

Process 600 includes generating (at 606) a first visualization of the point cloud from an initial render position. Generating (at 606) the first visualization includes rendering the set of points from the point cloud that are within a field-of-view created from the initial render position. The initial render position may be a default or last saved position for a virtual camera in the 3D space of the point cloud or a position that is specified by the user.

Process 600 includes detecting (at 608) an input that changes the initial render position to a second render position. For instance, the input may include moving, changing the orientation, rotating, and/or otherwise manipulating the position of the virtual camera within the 3D space of the point cloud.

Process 600 includes performing (at 610) gap detection from the second render position. Performing (at 610) the gap detection may include determining the set of points that are within the adjusted field-of-view created from the second render position. Graphics system 100 computes the distance separating different pairs of points from the set of points and/or the density of the points in the field-of-view. A gap occurs when the distance separating a pair of points is more than a threshold distance. The threshold distance may be set based on the distance between the second render position and the pair of points. For instance, a gap may be not be noticeable when a pair of points are separated by a particular distance and are a greater first distance from the second render position, and a gap may be noticeable when a pair of points are separated by the same particular distance and are a lesser second distance from the second render position. The gap detection includes identifying discontinuities in the adjusted field-of-view that are created when two or more points are separated by more than the threshold distance.

Process 600 includes differentiating (at 612) gaps in a continuous surface from gaps of distinct surfaces using the neural network model. Some gaps may not need to backfilled because the gaps are spaces between two disconnected surfaces and are therefore intentional gaps that are meant to be preserved, whereas other gaps may require backfilling because the gaps are spaces along a single continuous surface.

The neural network model may be used to differentiate between gaps of disconnected surfaces and gaps about a single continuous surface because the neural network model is defined with one or more functions for recreating the textures, contours, patterns, shapes, and/or other commonality of different continuous surfaces. Accordingly, the neural network model will generate points for each continuous surface with no gaps in the points, and the generated points may be compared to the points from the point cloud to determine if the gap is one that requires backfilling. More specifically, graphics system 100 analyzes the distribution or density of points created by the neural network model around the position of a detected gap. If the neural network model generates points that have the detected gap or generates points for two distinct surfaces, then graphics system 100 determines that the detected gap corresponds to a separation between two disconnected surfaces. However, if the neural network model generates points for the region around the position of the detected gap without the gap or generates points for a common surface, then graphics system 100 determines that the detected gap corresponds to a discontinuity in a single continuous surface.

Graphics system 100 differentiates between points of different surfaces by analyzing the positioning, coloring, and/or other non-positional elements of the points for commonality. For instance, points forming a common surface may be positioned according to a particular pattern or structure, may have a similar range of colors or colors that change by less than a threshold amount from neighboring points, or may have other non-positional commonality including common reflectance, opacity, and/or material properties. A first set of points in a particular region defined with a first material property (e.g., wood) may be associated with a first surface, and a second set of points in the particular region defined with a second material property (e.g., plastic) may be associated with a second surface.

In some embodiments, graphics system 100 performs the gap differentiation independent of the neural network model. In some such embodiments, graphics system 100 selects the set of points surrounding a gap, and analyzes the positional and non-positional values of the set of points for commonality. If the set of points are arranged according to a common pattern, have similar color values, and/or have other non-positional commonality, then graphics system 100 determines that the gap is within a single continuous surface. However, if a first subset of points on one side of the gap has different positioning or coloring than a second subset of points on the other side of the gap, then graphics system 100 determines that the gap is between two distinct surfaces and does not require backfilling.

Process 600 includes dynamically backfilling (at 614) each detected gap along a single continuous surface with points that are generated by the neural network model. The dynamic backfilling (at 614) includes inserting the generated points at defined positions within each detected gap to remove the visual discontinuity created by the gap.

In some embodiments, graphics system 100 inputs the 5D coordinate or position of a detected gap or the region surrounding the detected gap into the neural network model (e.g., a NeRF), and the neural network model outputs one or more points to fill the detected gap with a texture, contour, pattern, shape, and/or other commonality that matches the texture, contour, pattern, shape, and/or other commonality of the points that form the single continuous surface with the detected gap. In other words, the one or more points are not simply defined at the center of a pair of points with a gap and with color values that are derived from the average of the color values of the pair of points. Instead, the neural network model generates points that may be offset from the center of the pair of points in order to follow a non-uniform or patterned distribution of points that form a single continuous surface around the gap, and generates the points with color values that conform to the color distribution of the single continuous surface.

In some other embodiments, graphics system 100 performs an outward selection from the position of a detected gap. Specifically, graphics system 100 searches in all directions from the position of the detected gap to select points that have positional and non-positional commonality, and therefore represent the single continuous surface with the detected gap. Graphics system 100 may then select the function that is defined to represent that single continuous surface in the neural network model based on the coordinates of the single continuous surface, and may generate points to fill the detected gap in the single continuous surface using the selected function.

In still some other embodiments, graphics system 100 performs the dynamic backfilling (at 614) by defining one or more polygons to represent the single continuous surface. The points forming the single continuous surface may be used to define the vertices of each polygon. The dynamic backfilling may then include subdividing the defined polygons into smaller subsets of polygons, and defining new points for the dynamically backfilled (at 614) single continuous surface at the vertices of the smaller subsets of polygons that do not align with or are not set at positions of existing points.

In some embodiments, dynamically backfilling (at 614) each detected gap includes tagging the added points that are generated by the neural network model differently than the original points of the point cloud. The tagging allows graphics system 100 to differentiate between the original point cloud points and the generated points used to fill the gaps that appear at different zoom depths. The tagging may include adding a value or identifier to the metadata or a non-positional element of the generated points. In some embodiments, the tagging includes adding a value for the zoom depth or distance at which the added points are to be presented.

Graphics system 100 may reference the tags to determine which generated points to render and which to remove as the zoom depth or render position changes away from the second render position. The tagging allows graphics system 100 to generate the points for the dynamic backfilling once, and to reuse the generated points as the render position changes or the virtual camera is zoomed in and out of the point cloud.

Process 600 includes generating (at 616) a second visualization for the field-of-view at the second render position that includes the set of points from the point cloud that are within the field-of-view at the second render position and the backfilled points that are generated by the neural network model to remove any gaps, discontinuities, or other undesired openings between the set of points. In some embodiments, generating (at 616) the second visualization includes rendering the set of points from the point cloud in the field-of-view before generating and rendering the points to backfill gaps in the field-of-view. In some other embodiments, generating (at 616) the second visualization includes adding the points that are generated by the neural network model to the point cloud, and rendering the set of points with the generated points that are added to fill the detected gaps in the field-of-view.

The user may edit the points associated with the second visualization. The edits may be applied and may affect the original set of points as well as the backfilled points. For instance, graphics system 100 may receive a command to adjust the coloring of the single continuous surface represented in the second visualization, and graphics system 100 adjusts the colors of the original set of points from the point cloud as well as the colors of the backfilled points that were generated by the neural network model to fill gaps in the second visualization and/or the single continuous surface. Graphics system 100 may store the generated points with the adjusted color values as part of the original point cloud, and may dynamically present the generated points with the adjusted color values when the render position changes to a zoom depth that causes the gaps concealed by the generated points to appear.

Figure 7:
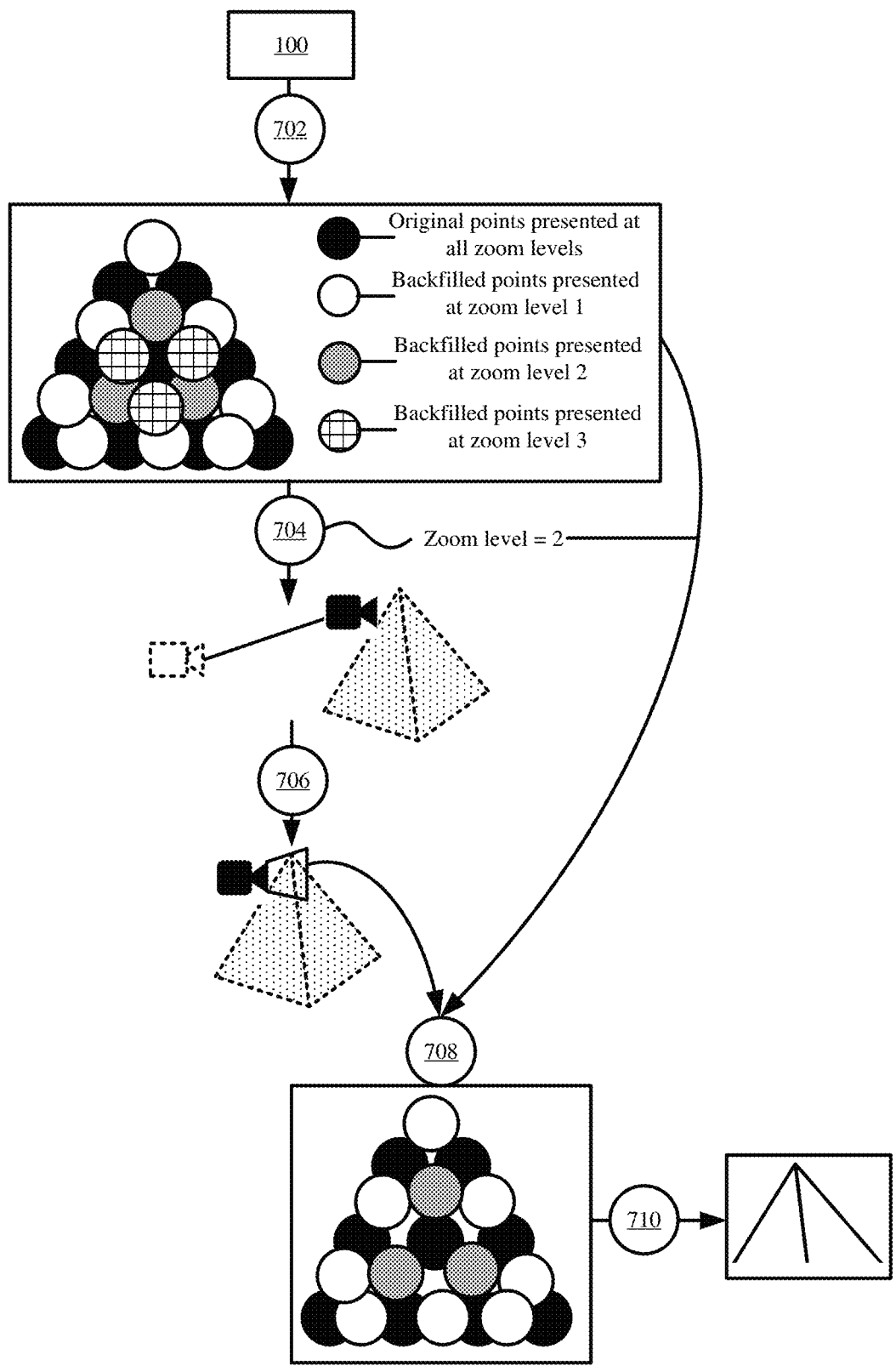
FIG. 7 illustrates an example of dynamically rendering a point cloud with different set of backfilled points that are associated with different zoom depths in accordance with some embodiments presented herein.

FIG. 7 illustrates an example of dynamically rendering a point cloud with different set of backfilled points that are associated with different zoom depths in accordance with some embodiments presented herein. Graphics system 100 performs the dynamic backfilling to generate (at 702) points with the neural network model that fill gaps at different zoom depths. Each of the generated points are therefore tagged or otherwise associated with a zoom depth value.

Graphics system 100 monitors (at 704) the zoom depth or render position. The zoom depth or render position changes in response to a user changing the position of a virtual camera within the 3D space of the point cloud or providing inputs that otherwise change the render position.

Graphics system 100 determines (at 706) the field-of-view associated with the current render position. Graphics system 100 selects (at 708) the set of points from the point cloud that are within the field-of-view and also selects (at 708) a subset of the backfilled points that are tagged with a value corresponding to the monitored (at 704) zoom depth or render position and/or a value that causes the subset of the backfill points to be rendered at the monitored (at 704) zoom depth or render position.

Graphics system 100 renders (at 710) the selected (at 708) set of points with the selected subset of the backfilled points. Graphics system 100 presents the rendered visualization for the current render position.

In some embodiments, graphics system 100 reduces the load associated with the dynamic backfilling by prioritizing the order with which the gaps are filled. In some such embodiments, graphics system 100 performs the prioritized dynamic backfilling based on the amount of variation or complexity associated with the surfaces containing the gaps. The variation or complexity may be determined based on the number of colors defined across the single surface, the density of points representing the single surface, and/or variety in the texture, contour, pattern, shape, and/or other commonality of the single surface.

Gaps along a uniform surface may be less visible than gaps along a surface with variation. The uniform surface may correspond to a low resolution, low detail, or background element, whereas the surfaces with the variation may correspond to a high resolution, high detail, or foreground element. Accordingly, graphics system 100 dynamically backfills gaps in the surfaces with more variation before dynamically backfilling gaps in the surfaces with less variation.

In some embodiments, graphics system 100 may perform a reverse prioritization. For instance, the lesser variation may cause the gaps or discontinuities to be more visible since there is less detail to obscure or blend with the gaps, and the greater variation may cause the gaps or discontinuities to blend in with the variation surrounding the gaps. In some such embodiments, graphics system 100 dynamically backfills gaps in the surfaces with less variation before dynamically backfilling gaps in the surfaces with more variation.

Figure 8:
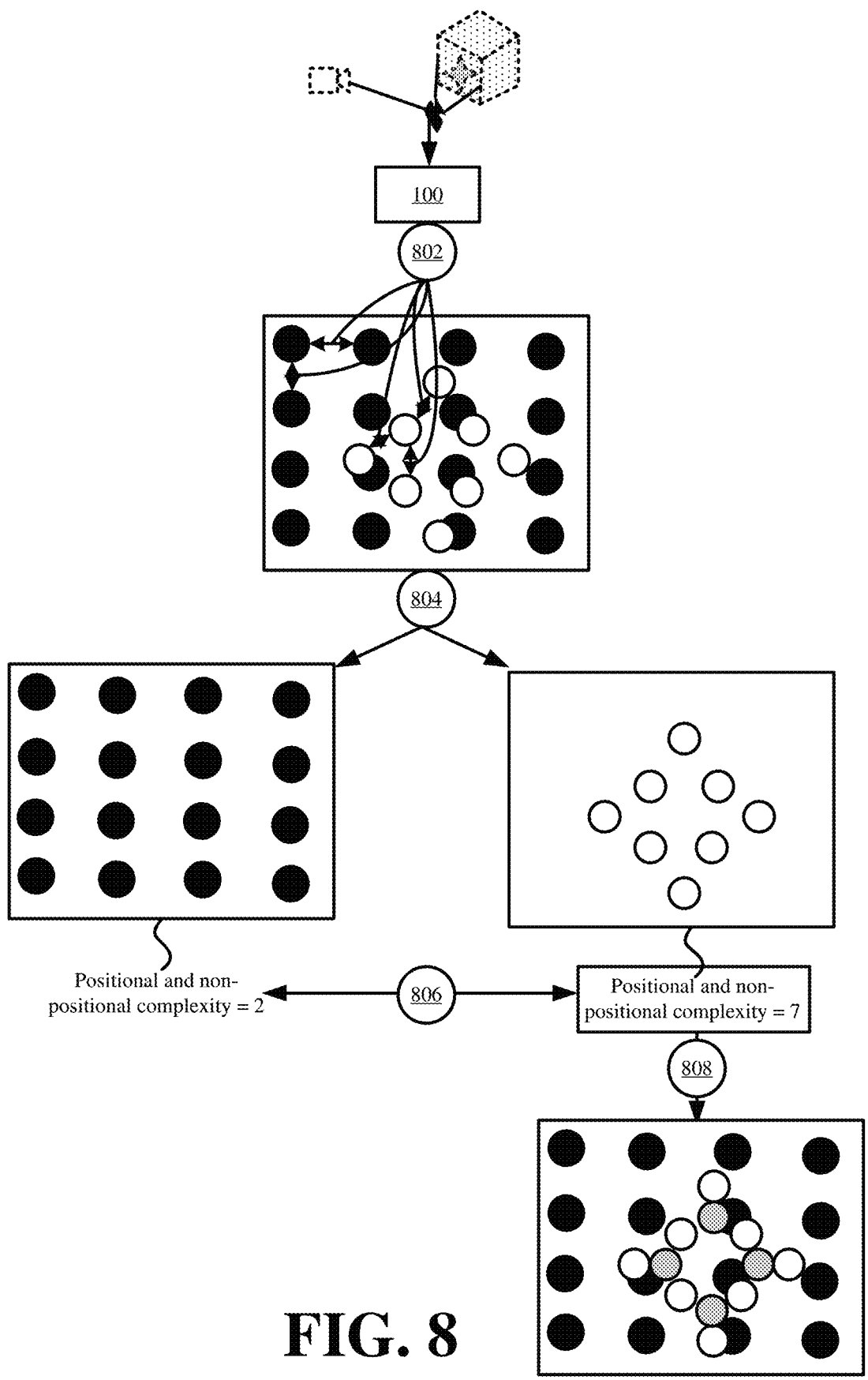
FIG. 8 illustrates an example of the prioritized dynamic backfilling in accordance with some embodiments presented herein.

FIG. 8 illustrates an example of the prioritized dynamic backfilling in accordance with some embodiments presented herein. Graphics system 100 detects (at 802) gaps within a first set of points that form a first surface in the field-of-view and within a second set of points that form a second surface in the field-of-view.

Graphics system 100 determines (at 804) the variation across the positioning and coloring of the first set of points and the second set of points. The positional variation is determined (at 804) according to the distribution of each set of points. There is less positional variation when all the points in a set of points are aligned about one or more planes and/or are distributed according to a simple pattern, and more positional variation when all the points are distributed across different planes and/or are distributed according to a complex pattern. The color variation is determined according to the number of different colors that are defined for the set of points and/or the frequency with which the color changes across the set of points.

Graphics system 100 prioritizes (at 806) the dynamic backfilling of the gaps within the second surface represented by the second set of points over the gaps within the first surface represented by the first set of points based on the determined (at 804) variation. Prioritizing (at 806) the dynamic backfilling includes selecting to backfill the gaps within the second set of points before backfilling the gaps within the first set of points.

Graphics system 100 dynamically backfills (at 808) the gaps within the second set of points with points that are generated by the associated neural network model. The neural network model is a connected set of synapses and/or one or more functions that reproduce the textures, contours, patterns, shapes, and/or other commonality of the second surface such that the points generated by the neural network model are defined with positional (e.g., x, y, and z coordinates) and non-positional (e.g., color values, opacity, reflectance, material property, etc.) elements that continue or adhere to the textures, contours, patterns, shapes, and/or other commonality defined in the positional and non-positional elements of the second set of points forming the second surface.

In some embodiments, graphics system 100 renders the first set of points to present a visualization of the first surface with the gaps, and renders the second set of points with the generated points to present a visualization of the second with the gaps concealed by the backfilled points.

Figure 9:
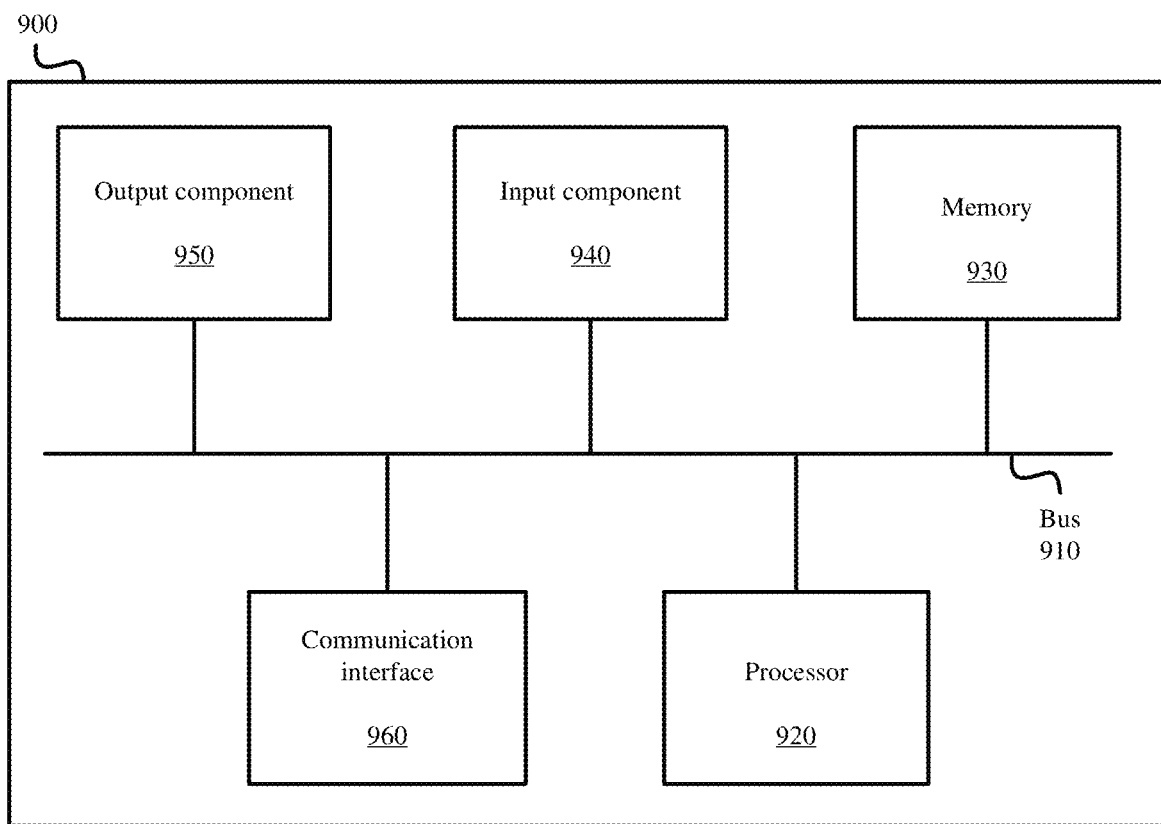
FIG. 9 illustrates example components of one or more devices, according to one or more embodiments described herein.

FIG. 9 is a diagram of example components of device 900. Device 900 may be used to implement one or more of the tools, devices, or systems described above (e.g., graphics system 100). Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more LEDs, etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
    receiving a point cloud comprising a first plurality of points that collectively form a three-dimensional ("3D") representation of an object or scene at a fixed resolution;
    defining a model that dynamically generates different densities of points for a modeled 3D representation of the object or scene based on image data from a plurality of two-dimensional ("2D") images that capture the object or scene from a plurality of viewpoints, wherein the model is defined independent of the point cloud and is used to supplement different presentations of the first plurality of points at different zoom depths with different points that are dynamically generated at each of the different zoom depths;
    determining that a render position set within the point cloud establishes a field-of-view that presents a set of points from the plurality of points at a particular zoom depth;
    determining that a spacing between the set of points at the particular zoom depth exposes a gap; and filling the gap with one or more points that are dynamically generated by the model, wherein said filling the gap comprises:
  generating a second plurality of points independent of the point cloud using the model, wherein the second plurality of points have more points than the first plurality of points and are not entirely aligned with the first plurality of points;
  selecting one or more points from the second plurality of points at positions that correspond to a position of the gap in the point cloud for insertion into the point cloud;
  generating the field-of-view from rendering the set of points of the point cloud with the one or more points from the second plurality of points that are generated by the model.

2. The method of claim 1 further comprising:
comparing points that are dynamically generated by the model against the first plurality of points from the point cloud; and
tuning the model based on deviations between the points that are dynamically generated by the model and the first plurality of points.

3. The method of claim 2, wherein filling the gap further comprises:
  generating the one or more points by the model after one or more parameters or weights of the model are adjusted as a result of said tuning.

4. The method of claim 2, wherein tuning the model comprises:
  defining a second model with one or more parameters or weights that differ from a first model;
  comparing points that are dynamically generated by the second model against the first plurality of points from the point cloud; and
  selecting the second model as the model in response to the points that are dynamically generated by the second model matching the first plurality of points from the point cloud more closely than points that are dynamically generated by the first model.

5. The method of claim 1, wherein determining that the spacing exposes the gap comprises:
  detecting that a distance between at least two points of the set of points rendered at the particular zoom depth exceeds a threshold.

6. The method of claim 1, wherein defining the model comprises:
  aligning the plurality of 2D images based on a different viewpoint from the plurality of viewpoints associated with each 2D image; and
  defining a radiance field that identifies a 3D position and coloring of a feature from the object or scene based on said aligning of the plurality of 2D images.

7. The method of claim 1, wherein the defining the model comprises:
  determining a function that recreates at least one of a texture, contour, pattern, shape, or commonality of a particular surface from the object or scene that is represented by the set of points.

8. The method of claim 7, wherein filling the gap further comprises:
  determining that the set of points form at least part of the particular surface; and
  generating, using the function, the one or more points with positions and coloring that continue the at least one of the texture, contour, pattern, shape, or commonality of the particular surface over the gap.

9. The method of claim 1, wherein defining the model comprises:
  modeling at least one texture, contour, pattern, shape, or commonality of a particular surface of the object or scene.

10. The method of claim 9, wherein filling the gap further comprises:
  generating the one or more points at positions that conceal the gap and that conform to the modeling of the at least one texture, contour, pattern, shape, or commonality of the particular surface of the object or scene.

11. The method of claim 1, wherein filling the gap further comprises:
  determining that the set of points correspond to a single continuous surface of the object or scene; and
  positioning the one or more points in the point cloud according to one or more of a texture, contour, pattern, shape, or commonality across the single continuous surface.

12. The method of claim 1, wherein filling the gap further comprises:
  determining that the set of points correspond to a single continuous surface of the object or scene; and
  defining color values of the one or more points based on a color distribution across the single continuous surface.

13. The method of claim 1, wherein filling the gap further comprises:
  generating the one or more points at positions over the gap that continue one or more of a shape, form, or structure of a single continuous surface formed by the set of points.

14. The method of claim 13, wherein filling the gap further comprises:
  defining colors of the one or more points that match to a distribution of colors over the single continuous surface at a position of the gap.

15. The method of claim 1 further comprising:
  differentiating the one or more points that are dynamically generated by the model from the first plurality of points of the point cloud by tagging the one or more points with a identifier that indicates the one or more points are not original points of the point cloud.

16. A system comprising:
one or more hardware processors configured to:
  receive a point cloud comprising a first plurality of points that collectively form a three-dimensional ("3D") representation of an object or scene at a fixed resolution;
  define a model that dynamically generates different densities of points for a modeled 3D representation of the object or scene based on image data from a plurality of two-dimensional ("2D") images that capture the object or scene from a plurality of viewpoints, wherein the model is defined independent of the point cloud and is used to supplement different presentations of the first plurality of points at different zoom depths with different points that are dynamically generated at each of the different zoom depths;
  determine that a render position set within the point cloud establishes a field-of-view that presents a set of points from the plurality of points at a particular zoom depth;
  determine that a spacing between the set of points at the particular zoom depth exposes a gap; and fill the gap with one or more points that are dynamically generated by the model, wherein said filling the gap comprises:
    generating a second plurality of points independent of the point cloud using the model, wherein the second plurality of points have more points than the first plurality of points and are not entirely aligned with the first plurality of points;
    selecting one or more points from the second plurality of points at positions that correspond to a position of the gap in the point cloud for insertion into the point cloud;
    generating the field-of-view from rendering the set of points of the point cloud with the one or more points from the second plurality of points that are generated by the model.

17. The system of claim 16, wherein the one or more hardware processors are configured to:
    compare points that are dynamically generated by the model against the first plurality of points from the point cloud; and
    tune the model based on deviations between the points that are dynamically generated by the model and the first plurality of points.

18. The system of claim 17, wherein filling the gap further comprises:
    generating the one or more points by the model after one or more parameters or weights of the model are adjusted as a result of said tuning.

19. The system of claim 17, wherein tuning the model comprises:
    defining a second model with one or more parameters or weights that differ from a first model;
    comparing points that are dynamically generated by the second model against the first plurality of points from the point cloud; and
    selecting the second model as the model in response to the points that are dynamically generated by the second model matching the first plurality of points from the point cloud more closely than points that are dynamically generated by the first model.

20. A non-transitory computer-readable medium storing instructions that, when executed by one or more processors of a graphics system, cause the graphics system to perform operations comprising:
    receiving a point cloud comprising a first plurality of points that collectively form a three-dimensional ("3D") representation of an object or scene at a fixed resolution;
    defining a model that dynamically generates different densities of points for a modeled 3D representation of the object or scene based on image data from a plurality of two-dimensional ("2D") images that capture the object or scene from a plurality of viewpoints, wherein the model is defined independent of the point cloud and is used to supplement different presentations of the first plurality of points at different zoom depths with different points that are dynamically generated at each of the different zoom depths;
    determining that a render position set within the point cloud establishes a field-of-view that presents a set of points from the plurality of points at a particular zoom depth;
    determining that a spacing between the set of points at the particular zoom depth exposes a gap; and
    filling the gap with one or more points that are dynamically generated by the model, wherein said filling the gap comprises:
        generating a second plurality of points independent of the point cloud using the model, wherein the second plurality of points have more points than the first plurality of points and are not entirely aligned with the first plurality of points;
        selecting one or more points from the second plurality of points at positions that correspond to a position of the gap in the point cloud for insertion into the point cloud;
        generating the field-of-view from rendering the set of points of the point cloud with the one or more points from the second plurality of points that are generated by the model.

* * * * *